US012226359B2

(12) United States Patent
Zanyk

(10) Patent No.: US 12,226,359 B2
(45) Date of Patent: Feb. 18, 2025

(54) ORTHOPEDIC DEVICE

(71) Applicant: W2DESIGNS LLC, South Glastonbury, CT (US)

(72) Inventor: Marien J. Zanyk, South Glastonbury, CT (US)

(73) Assignee: W2DESIGNS LLC, South Glastonbury, CT (US)

( * ) Notice: Subject to any disclaimer, the term of this patent is extended or adjusted under 35 U.S.C. 154(b) by 160 days.

(21) Appl. No.: 16/640,625

(22) PCT Filed: Aug. 22, 2018

(86) PCT No.: PCT/US2018/047589
§ 371 (c)(1),
(2) Date: Feb. 20, 2020

(87) PCT Pub. No.: WO2019/040657
PCT Pub. Date: Feb. 28, 2019

(65) Prior Publication Data

US 2020/0179211 A1 Jun. 11, 2020

Related U.S. Application Data

(60) Provisional application No. 62/554,662, filed on Sep. 6, 2017, provisional application No. 62/548,519, filed on Aug. 22, 2017.

(51) Int. Cl.

| | |
|---|---|
| ***A61H 1/02*** | (2006.01) |
| ***A63B 23/08*** | (2006.01) |
| ***A63B 23/10*** | (2006.01) |

(52) U.S. Cl.
CPC ........... *A61H 1/0266* (2013.01); *A63B 23/08* (2013.01); *A63B 23/10* (2013.01);
(Continued)

(58) Field of Classification Search
CPC .. A61H 1/0266; A61H 1/00; A61H 2001/027; A61H 2001/1284;
(Continued)

(56) References Cited

U.S. PATENT DOCUMENTS 1,516,464 A * 11/1924 Taplin .................... A61H 1/008 606/237
1,664,664 A * 4/1928 Crum ..................... A63B 23/10 482/79
(Continued)

OTHER PUBLICATIONS

Outdoor Essentials Outdoor Faux Rock Cover—for Landscaping, Yard Décor, & Gardens—Water-Proof, Lightweight, Wind-Resistant, Tan, Small (Year: 2015).*
(Continued)

*Primary Examiner* — Tu A Vo
*Assistant Examiner* — Kelsey E Baller
(74) *Attorney, Agent, or Firm* — Wm. Tucker Griffith; Lathrop GPM LLP

(57) ABSTRACT

An orthopedic device positions the foot with respect to surfaces to manipulate the foot and, optionally, the ankle and lower leg for stretching and strengthening of the muscles, tendons, and ligaments of the foot, ankle, and lower leg. The device includes a base to provide support for the device against a surface. The device also includes a first portion having a first surface shaped to complement a heel of the foot, with the heel against the first surface; a second portion having a second surface shaped to position a forefoot of the foot in plantar flexion with the forefoot against the second surface; and a third portion having a third surface shaped to position toes of the foot in extension with the toes against the third surface.

21 Claims, 17 Drawing Sheets

(52) U.S. Cl.
CPC .................. *A61H 2001/027* (2013.01); *A61H 2201/1284* (2013.01); *A61H 2201/164* (2013.01); *A61H 2201/169* (2013.01); *A61H 2205/12* (2013.01)

(58) Field of Classification Search
CPC ........ A61H 2001/164; A61H 2001/169; A61H 2205/12; A61H 7/001; A63B 21/4039; A63B 23/10; A63B 23/08; A63B 23/035; A63B 23/04
USPC ............................. 601/29, 99; D24/200, 212
See application file for complete search history.

(56) References Cited

U.S. PATENT DOCUMENTS 2,752,915 A * 7/1956 Riblet .................... A61H 15/00 601/118
D283,052 S * 3/1986 Eugster .................. A43B 7/146 D24/212
5,087,036 A 2/1992 Cooper
5,735,804 A * 4/1998 Chan ...................... A43B 7/146 36/141
5,807,213 A 9/1998 Poncini
5,913,839 A * 6/1999 Wincek .................. A61H 15/00 601/134
6,293,916 B1 * 9/2001 Alviso ................... A61H 7/001 601/134
6,942,604 B2 * 9/2005 Teff .................... A63B 21/0552 482/79
D698,933 S * 2/2014 Pan ........................ A43B 7/087 D24/212
D727,001 S * 4/2015 Goldie ................... A61H 23/02 D2/917
9,364,382 B1 * 6/2016 Cooper ................ A61H 1/0266
9,446,288 B1 9/2016 Pazan
9,775,770 B2 * 10/2017 Eastman ................ A61H 23/02
D807,079 S * 1/2018 Failing ............... A63B 21/4039 D6/592
10,470,915 B2 * 11/2019 Ferri ....................... G09F 21/02
2002/0049469 A1 * 4/2002 Chang .................... A43B 7/146 606/204
2004/0259695 A1 * 12/2004 Cardarelli .............. A63B 23/08 482/79
2009/0056164 A1 3/2009 Chen
2009/0111669 A1 * 4/2009 Richter .............. A63B 21/4039 482/142
2012/0040810 A1 2/2012 Astilla
2013/0184126 A1 7/2013 Kole et al.
2014/0259756 A1 * 9/2014 Pan ........................ A43B 7/087 36/43
2014/0315694 A1 10/2014 Singh
2018/0214733 A1 * 8/2018 DeNunzio .......... A63B 21/4037
2019/0070459 A1 * 3/2019 Michaud .......... A63B 21/00047

OTHER PUBLICATIONS

PCT Application No. PCT/US18/047589, International Search Report and Written Opinion dated Nov. 5, 2018.

* cited by examiner

ORTHOPEDIC DEVICE

CROSS-REFERENCE TO RELATED APPLICATIONS

The present application is a U.S. National Stage Entry of International Application No. PCT/US2018/047589, filed Aug. 22, 2018, entitled, "Orthopedic Device," which claims the benefit of and priority to U.S. Provisional Application No. 62/548,519, filed Aug. 22, 2017, entitled, "Orthopedic Device," and U.S. Provisional Application No. 62/554,662, filed Sep. 6, 2017, entitled, "Orthopedic Device," each of which is hereby incorporated by reference herein in its entirety.

FIELD OF THE INVENTION

The present invention relates to an orthopedic device and, more specifically, to a device that promotes pain and injury relief and stretching of the foot (including the toes), ankle, and lower leg.

BACKGROUND OF THE INVENTION

Individuals generally have a need and a desire to stay healthy and pain free throughout life. To achieve these goals, individuals often look to using various exercise equipment. With regard to health of the feet and ankles, and the need to prevent and recover from conditions involving the foot, inclusive of the toes, ankle and lower leg, it is important to manipulate the foot after a surgery or an injury to recover substantially the entire full range of motion and use of the foot. Further, with reference to therapeutic options specific to feet and ankles, current options are not desirable due to limited offerings of outdated equipment and ineffective applications which include awkward "home" remedies, ineffective socks, and limited plastic devices. A need exists, therefore, for a device that can assist in positioning the foot to promote the correct range of motion and manipulation of the foot, in addition to the ankle and the lower leg.

SUMMARY OF THE INVENTION

Aspects of the present disclosure include a device that aids in pain and stiffness relief in the foot, ankle, and lower leg. The device provides assistance to promote substantially full and substantially pain-free movement in the joints and soft tissue of the foot, ankle, and lower leg. The device further positions the foot to promote the correct movement of the foot for recovery of substantially the full range of motion after an injury or a surgery or for treatment or prevention of foot disorders or musculoskeletal problems of the foot and ankle. The device further promotes soft tissue elongation and targeted musculoskeletal manipulation to stretch and strengthen the soft tissues through joints in the foot and ankle. The device also positions the foot to promote massaging of one or more areas of the foot for pain relief. The device includes uniquely contoured surfaces that enable effective positions for comfortable stretching and strengthening with effect and safety.

At least one aspect of the present disclosure includes a device for manipulating at least one foot. The device includes a base configured to provide support for the device against a surface. The device also includes a first portion having a first surface shaped to compliment a heel of the at least one foot, with the heel against the first surface. The device further includes a second portion having a second surface shaped to position a forefoot of the at least one foot in plantar flexion with the forefoot against the second surface. The device also includes a third portion having a third surface shaped to position one or more toes of the at least one foot in extension with the one or more toes against the third surface.

In one or more aspects, the third surface of the device can include a plurality of indentations. Each indentation of the plurality of indentations is configured to compliment one toe of the one or more toes with the one or more toes against the third surface. The plurality of indentations can be arranged on the third surface for the one or more toes of a left foot. The plurality of indentations can alternatively be arranged on the third surface for the one or more toes of a right foot. The plurality of indentations can include four indentations configured to compliment four toes of the at least one foot. The four toes can be the big toe, the second toe, the third toe, and the fourth toe. Alternatively, the plurality of indentations can include five indentations configured to compliment five toes of the at least one foot.

In one or more aspects, the device can include a fourth portion having a fourth surface shaped to position one or more toes of the at least one foot in extension with the one or more toes against the fourth surface. The third surface of the device can include a first plurality of indentations. Each indentation of the first plurality of indentations can be configured to compliment one toe of a first foot of the at least one foot. Further, the fourth surface can include a second plurality of indentations. Each indentation of the second plurality of indentations can be configured to compliment one toe of a second foot of the at least one foot. The first foot can be a right foot and the second foot can be a left foot.

In one or more aspects, the device can be asymmetrical along a longest dimension of the device. In one or more aspects, the first surface can be angled relative to the base about 15 to 25 degrees. In one or more aspects, the second surface can form approximately a right angle. In one or more aspects, a distal portion of the second surface can be approximately parallel to the base.

In one or more aspects, the device can include a transition surface between the first surface and the second surface. The transition surface can include at least one partially spherical section. Alternatively, the transition surface can include two partially spherical portions.

In one or more aspects, the first surface is asymmetrical along a longest dimension of the device. In one or more aspects, the second surface is symmetrical along a longest dimension of the device.

At least another aspect of the present disclosure includes a device for manipulating feet. The device includes a base configured to provide support for the device. The device also includes a first portion having a first surface shaped to compliment a heel of a foot, with the heel against the first surface. The device also includes a second portion having a second surface shaped to position one or more toes of one foot of a right foot or a left foot in extension with the one or more toes of the one foot against the second surface.

In one or more aspects, the device can include a third portion having a third surface shaped to position one or more toes of an opposite foot of the one foot in extension with the one or more toes of the opposite of the one foot against the third surface.

At least another aspect of the present disclosure includes a device for manipulating feet. The device includes a base configured to provide support for the device. The device further includes a first portion having a first surface shaped to position a forefoot of a foot in plantar flexion with the forefoot against the first surface. The device also includes a second portion having a second surface shaped to position one or more toes of one foot of a right foot or a left foot in extension with the one or more toes of the one foot against the second surface.

In one or more aspects, the device includes a third portion having a third surface shaped to position one or more toes of an opposite foot of the one foot in extension with the one or more toes of the opposite foot against the third surface.

Additional aspects of the present disclosure will be apparent to those of ordinary skill in the art in view of the detailed description of various embodiments, which is made with reference to the drawings, a brief description of which is provided below.

Figure 1A:
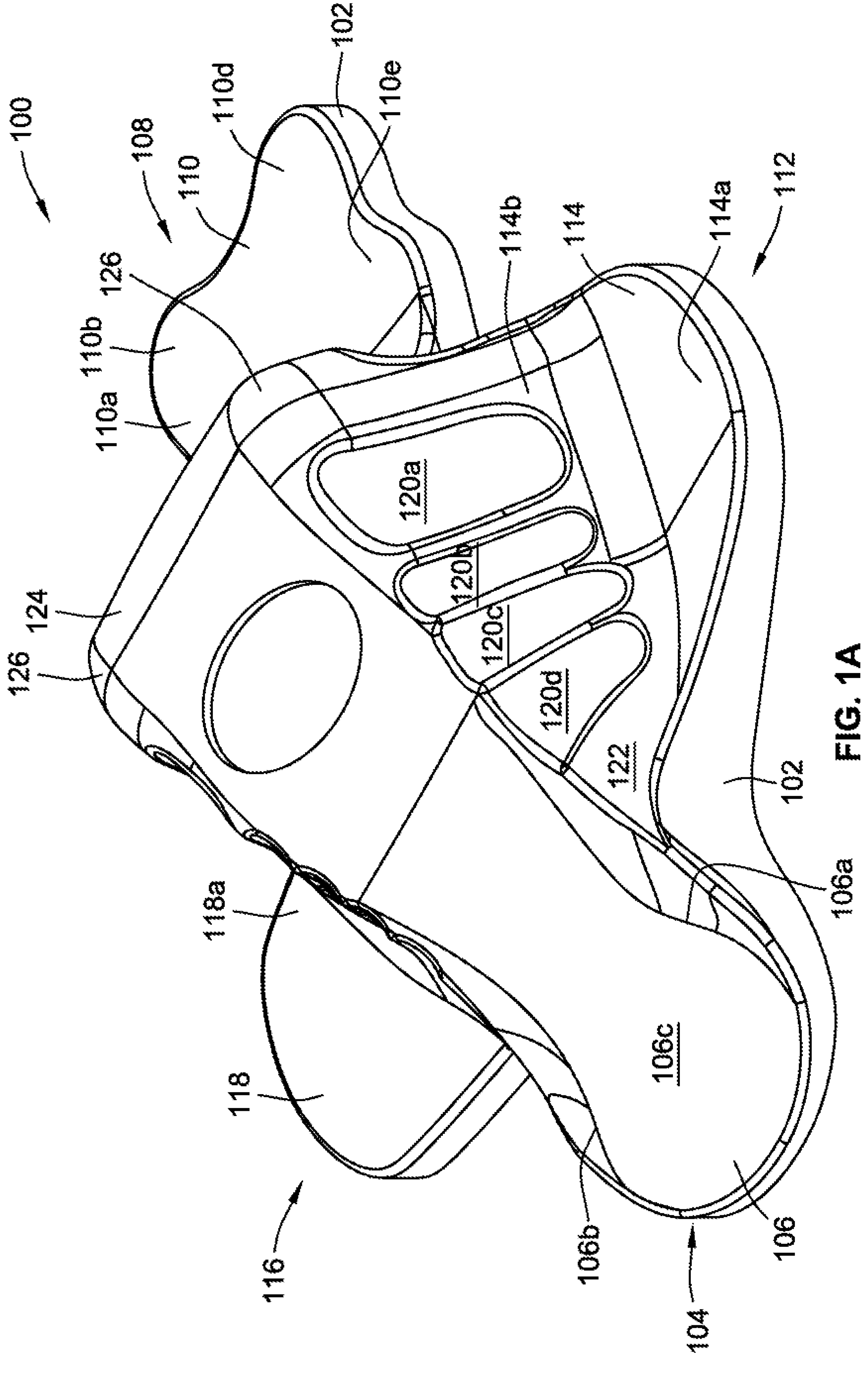
FIG. 1A illustrates a perspective view of the orthopedic device, in accord with aspects of the present disclosure.

While the disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Disclosed is a device that has one or more contoured surfaces that creates a multi-functional tool for end of range stretch, recovery, and strengthening of the intrinsic musculature of the feet, ankles, toes, and portions of the lower leg. The device promotes soft tissue relief, bony alignment correction, and pain recovery from diagnoses of, for example, Achilles tendonitis, plantar fasciitis, toe mobility restrictions, and the need for massage and tissue stimulation.

The device can further include one or more toe indentations that enable the full range of movement of the lower appendages by the promotion of movement progressions with the aid of body weight. The device promotes soft tissue movement, correction, improvement, and recovery based, in part, on the orthopedic science of stretch and the associates benefits.

Referring to FIG. 1A, illustrated is a perspective view of the orthopedic device 100, in accord with aspects of the present disclosure. FIGS. 1B through 1F illustrate alternative views of the orthopedic device 100 of FIG. 1A, which are referenced separately below with respect to one or more elements of the device 100.

The device 100 has a one-size-fits-all configuration. The contoured surfaces of the device 100 (discussed further below) are designed to provide area for contact with the foot while also allowing for larger or smaller feet. The surfaces of the device 100 do not have longitudinal or latitudinal boundaries that would otherwise prevent feet of greater than a defined length from using the device 100. With the one-size-fits-all configuration, the device 100 can be large enough to accommodate most foot sizes and be configured to place the foot in a proper position regardless of the size of the foot.

Each surface of the device 100 orientates the foot with respect to the device 100 based on an area of the foot. In one or more embodiments, the orientation of the foot on the device 100 can be the heel of the foot, the ball or forefoot of the foot, the toes of the foot, etc. The length of the device 100 can be long enough to accept most, if not all, foot sizes with the desired area of the foot placed at a common point for all feet when using the device 100. Accommodating various foot sizes is discussed further below with respect to each specific portion of the device 100. In one or more embodiments, the device 100 can be about 34 cm long, about 30 cm wide, and about 8 cm tall.

The device 100 includes a base 102. The base 102 is configured to provide support for the device 100 against a surface upon which the device 100 rests. As illustrated, the base 102 can be substantially flat to provide support for the device 100 against a substantially flat surface. However, the base 102 can have other configurations depending on the shape or contour of the surface upon which the device 100 is configured to sit. Although the base 102 can be configured to rest on a surface, in one or more embodiments, the base 102 can include one or more mechanical attachments that allow for coupling of the device 100 to a surface. For example, the base 102 can include one or more slots or apertures that allow for a protrusion or other exposed element on a surface to engage to and couple with the base 102.

In one or more embodiments, the base 102 can be about 1.5 cm tall. However, the base 102 can be various heights without departing from the scope of the present disclosure. Additionally, the height of the base 102 can vary along the length of the base 102. In one or more embodiments, the height of the base 102 can be as short as possible so that the surfaces of the device 100 are as close to the ground as possible. In which case, the height of the base 102 can be limited only by the minimum thickness needed to maintain structural rigidity and support of the other surfaces.

In one or more embodiments, the base 102 can be an outline or perimeter with the remaining bottom of the device 100 hollow or open. Alternatively, the base 102 can be a continuous surface across the entire underside of the device 100.

The device 100 includes a first portion 104 that has a first surface 106. The first surface 106 of the first portion 104 is shaped to compliment the heel of a foot with the heel on the first surface 106. In one or more embodiments, the first surface 106 at least partially compliments the heel by having ridges **106*a*,106*b* in the first surface 106 at a heel section 106*c*. The ridge 106*a* cups the heel on one side, and the ridge 106*b* cups the heel on the opposite side. The ridges 106*a*, 106*b* assist in centrally locating the foot on the device 100 at the heel section 106*c* and maintaining the foot on the device 100 while the lower leg moves, as further described below with respect to FIGS. 2A and 2B. In one or more embodiments, the ridges 106*a*, 106*b* can be configured to be foot independent such that the ridges 106*a*, 106*b* compliment the heel of the right foot or left foot equally. In one or more embodiments, the ridges 106*a*, 106*b* can be configured to be foot dependent such that the ridges 106*a*, 106*b* compliment one heel of a foot (i.e., right foot or left foot) more than the other foot (i.e., left foot or right foot). For example, the ridge 106*a* can be one height to better compliment feet that require a certain arch support, and the ridge 106*b*** can be another height to better compliment feet that require a different arch support, such as higher or lower.

In one or more embodiments, the first surface 106 can be substantially flat where the first surface 106 corresponds with the arch of the foot. Alternatively, in one or more embodiments, the first surface 106 can be curved where the first surface 106 corresponds with the arch. The curvature can be contoured to compliment the corresponding curvature of the arch.

In one or more embodiments, the width of the first surface 106 is constant along its length. In one or more embodiments, the width of the first surface 106 can increase along its length forward of the heel portion **106*c*, at the heel portion 106*c*, or both. In one or more embodiments, the width of the first surface 106 can be about 9.5 cm beyond the heel portion 106*c*, and increase in about 0.5 cm increments corresponding to the toe indentations discussed below. For example, the width of the first surface 106 can be about 9.5 cm at the first toe indentation, about 10 cm at the next toe indentation, about 10.5 cm at the next toe indentation, and about 11 cm at the final toe indentation. The first surface 106 can be about 13 cm at the distal end at the transition surface, discussed below. The heel portion 106*c* can have a width of about 8 cm across the center of the heel portion 106*c*. The width can narrow to about 6 cm at the distal end of the heel portion as the first surface 106** extends forward.

Figure 1B:
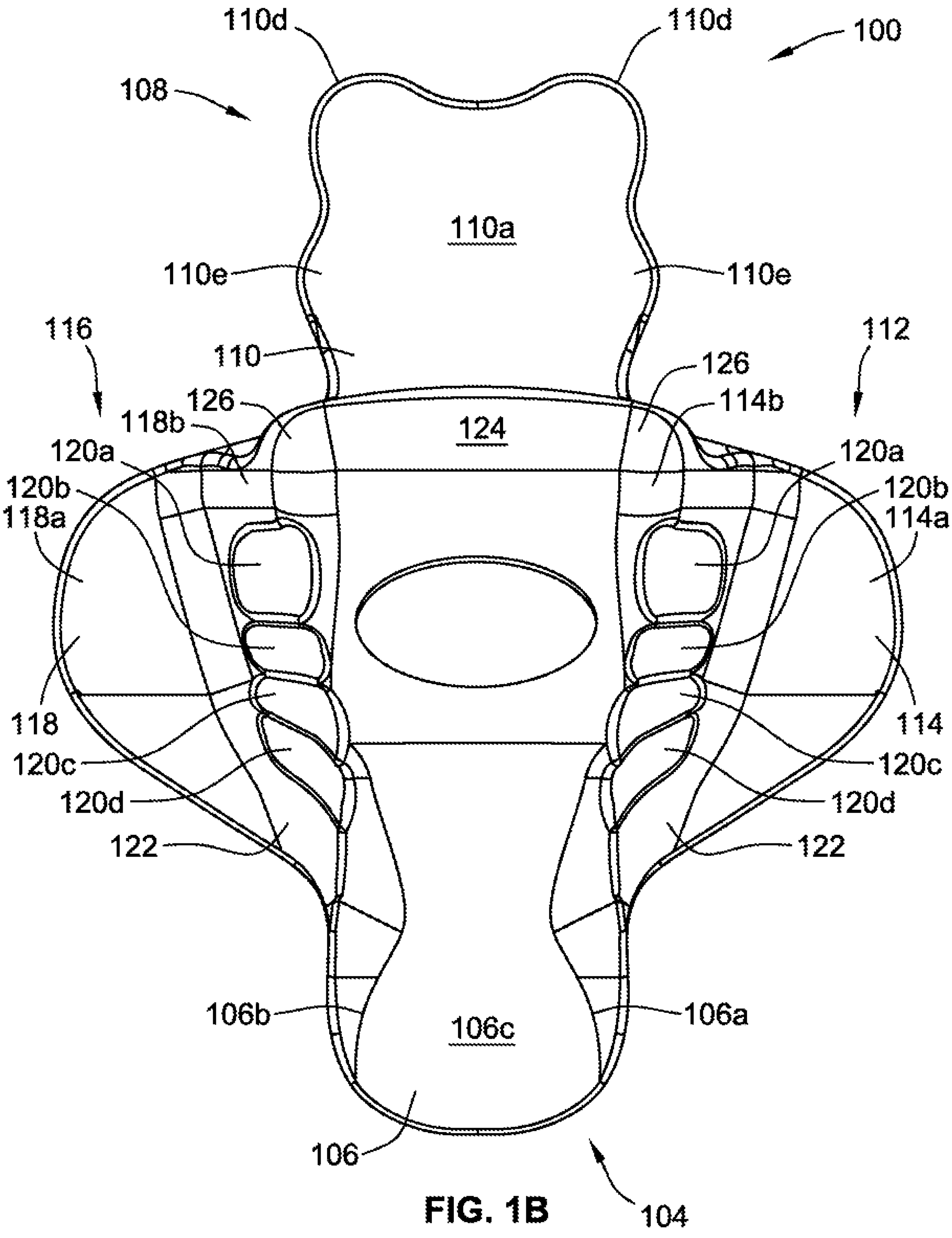
FIG. 1B illustrates a top view of the orthopedic device, in accord with aspects of the present disclosure.
Figure 1C:
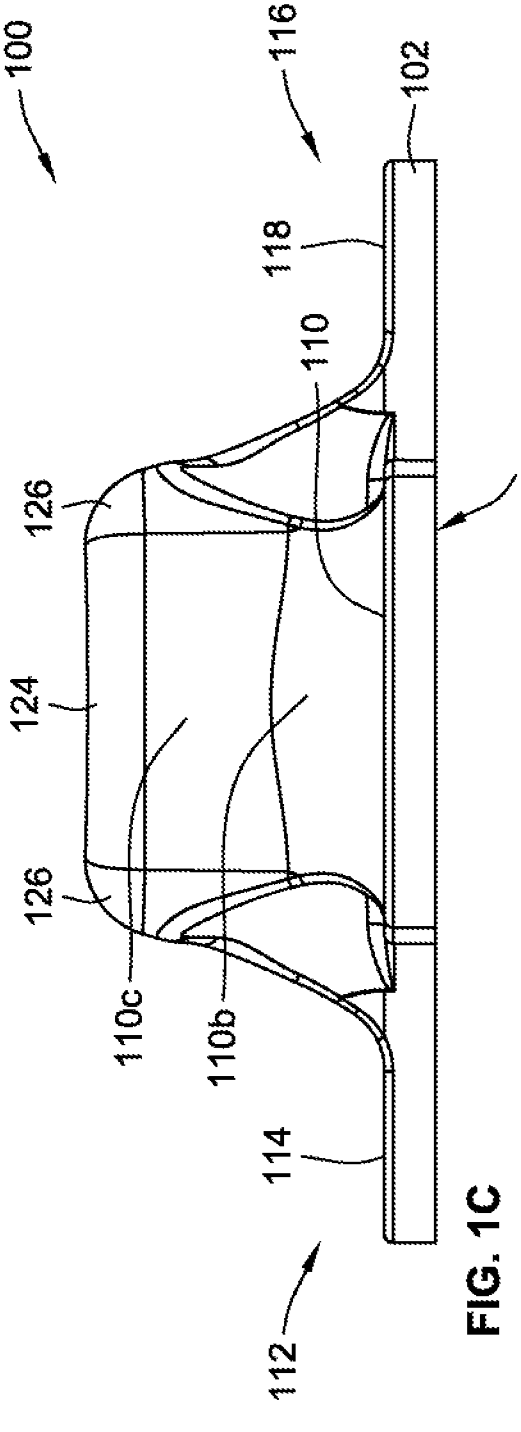
FIG. 1C illustrates a front view of the orthopedic device, in accord with aspects of the present disclosure.
Figure 1D:
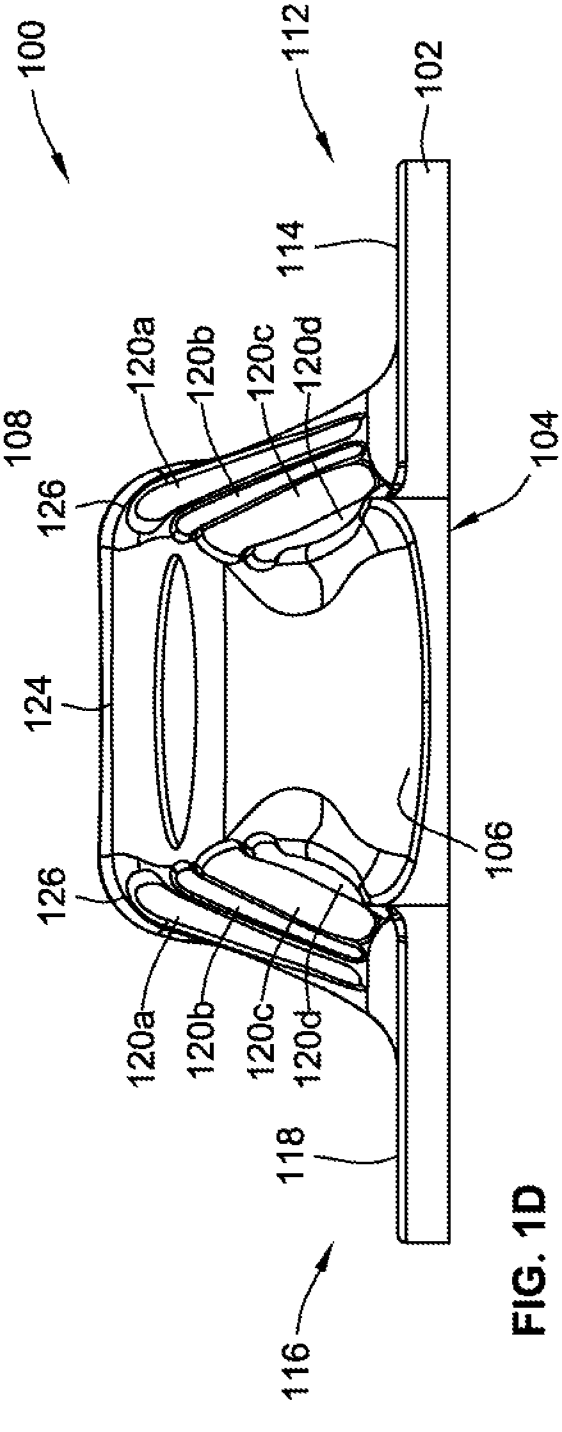
FIG. 1D illustrates a back view of the orthopedic device, in accord with aspects of the present disclosure.
Figure 1E:
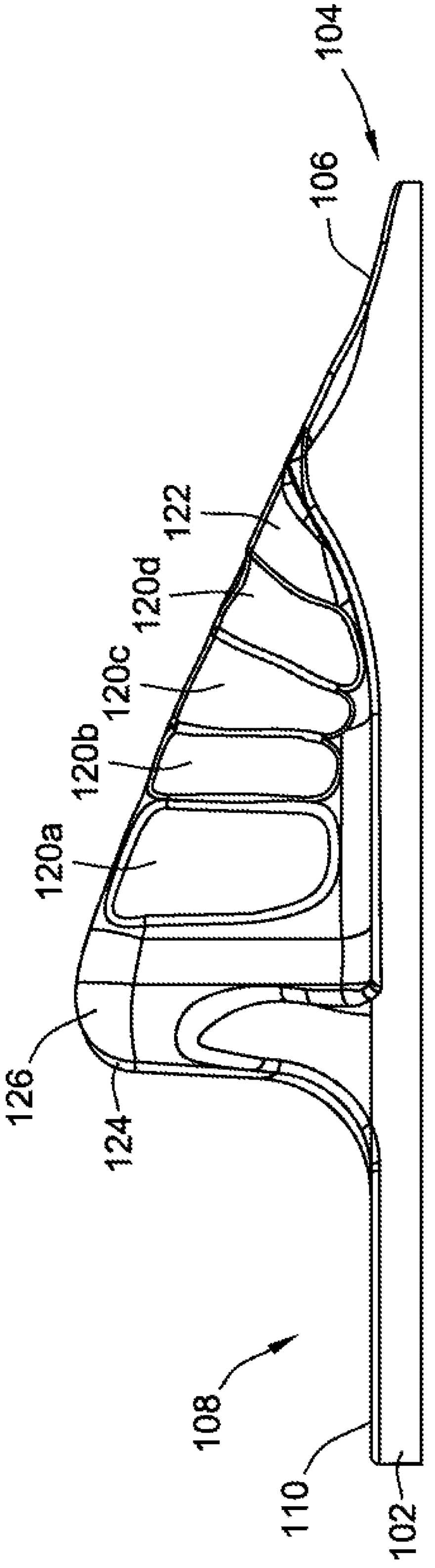
FIG. 1E illustrates a right-side view of the orthopedic device, in accord with aspects of the present disclosure.
Figure 1F:
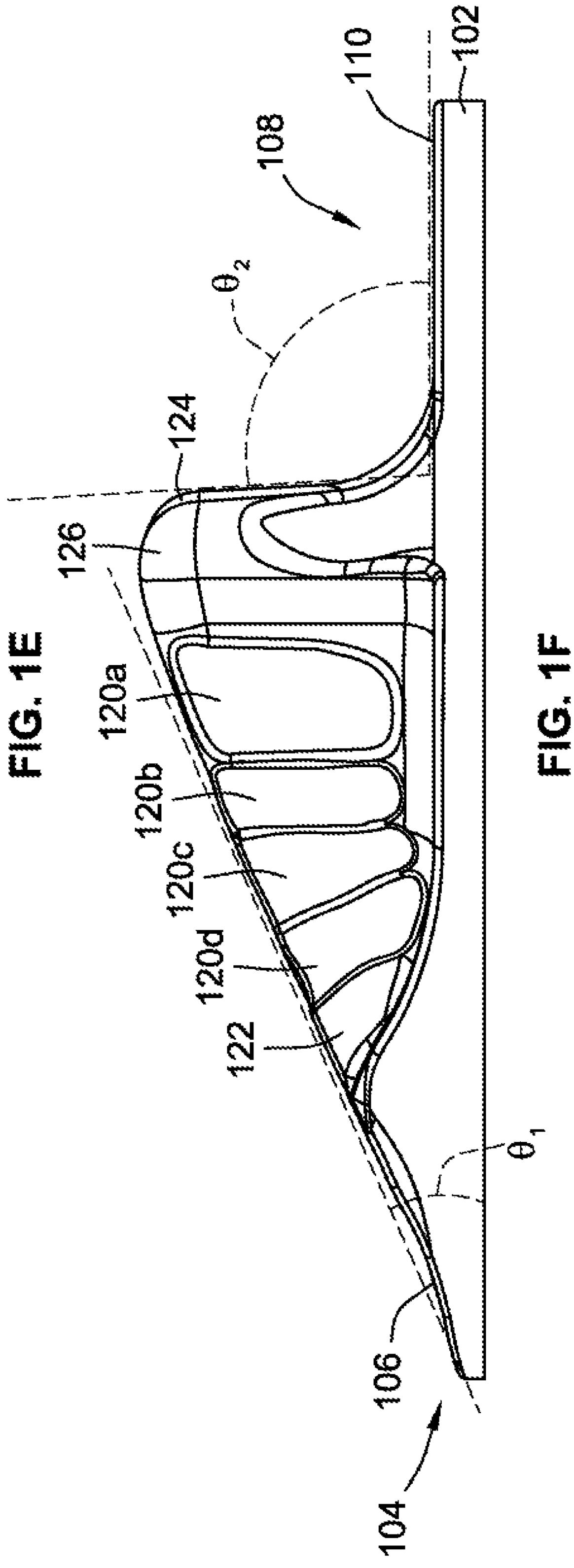
FIG. 1F illustrates a left-side view of the orthopedic device, in accord with aspects of the present disclosure.

Referring to FIG. 1E, in one or more embodiments, the first surface 106 of the first portion 104 can be inclined relative to the base 102 at an angle θ1. The angle θ1 can be about 15° to 45°. In one or more preferred embodiments, the angle θ1 can be about 15°-20°, 20°-25°, 25°-30°, or 30°-35°. In one or more most preferred embodiments, the angle θ1 can be about 18°. The angle θ1 of the first surface 106 forces the foot into dorsiflexion when the foot is against the first surface 106 and the user is standing in an upright position on the device 100. Further, a user with his or her foot against the first surface 106 can move his or her leg relative to the device 100 to go through a full range of dorsiflexion, such as about 0° to about 20°. This allows the user to manipulate the foot and the associated muscles, tendons, and ligaments, both on the foot and on the ankle and lower leg, with respect to the full range of dorsiflexion.

In one or more embodiments, the heel section **106*c* of the first surface 106 can be substantially parallel to the base 102. The first surface 106 forward of the heel section 106*c* can be inclined relative to the base 102 and the first section 106*a*. In such embodiments, the second section 106*b* can be inclined at the angle θ1 rather than the entire first surface 106. However, in one or more embodiments, the entire first surface 106, including the heel portion 106*c*, can be inclined relative to the base 102 at the angle θ1**.

In one or more embodiments, the length of the first surface 106 can be about 26 cm. However, the length can vary depending on the overall size of the device 100. In one or more embodiments, the length of the heel section **106*c* can be about 19 cm, and the length of the first surface 106 forward of the heel section 106*c* can be about 7 cm. However, the length of the heel section 106*c* and the remainder of the first surface 106 can vary without departing from the scope of the present disclosure. Moreover, the length of the heel section 106*c* relative to the remainder of the first surface 106 can vary without departing from the scope of the present disclosure. For example, the heel section 106*c* can the longer in length, shorter in length, or the same length as the remainder of the first surface 106**.

The device 100 includes a second portion 108 that has a second surface 110. The second surface 110 is shaped to position a forefoot of a foot in plantar flexion with the foot against the second surface 110. The second surface 110 places the forefoot in plantar flexion by having a flat section **110*a*, a curved section 110*b*, and a flat section 110*c***.

In one or more embodiments, the flat section **110*a* can be about 7 cm to 11 cm about cm long from the curved section 110*b* to the distal edge, in a preferred embodiment about 10.5 cm, and the combination of the curved section 110*b* and the flat section 110*c* can be about 8 cm. However, the flat section 110*a*, the curved section 110*b*, and the flat section 110*c*** can have various lengths without departing from the scope of the present disclosure.

In one or more embodiments, the second surface 110 can include distal protrusions **110*d*. The distal protrusions 110*d*** can support the big toe of the foot with the foot in plantar flexion. As illustrated in FIG. 1B, the second surface 110 can include two distal protrusions 110*d*. However, in one or more embodiments, the second surface 110 may include only one distal protrusion 110*d* on, for example, the right side for a left foot or on the left side for a right foot. In one or more embodiments, the width of the first section 110*a* at the distal protrusions 110*d* can be about 13.5 cm.

In one or more embodiments, the second surface 110 can include medial protrusions 110*e*. The medial protrusions 110*e* can support the metatarsophalangeal joint of the foot. The medial protrusions 110*e* can accommodate the flare out of the head of the metatarsal. In one or more embodiments, the width of the first section 110*a* at the medial protrusions 110*e* can be about 13 cm. In one or more embodiments, the distal protrusions 110*d* can extend beyond the medial protrusions 110*e*, the medial protrusions 110*e* can extend beyond the distal protrusions 110*d*, or the medial protrusions 110*e* can extend outward the same distance as the distal protrusions 110*d*.

Referring to FIG. 1E, the third section 110*c* of the second surface 110 can be angled relative to the first section 110*a* the angle θ2. In one or more embodiments, the angle θ2 can be about 90° to 120°. In one or more preferred embodiments, the angle θ2 can be about 105°. The angle θ2 of the second surface 110 forces the foot into plantar flexion when the foot is against the second surface 110, as described below with respect to FIGS. 3A and 3B. With the foot of a user against the second surface 110, the user can achieve approximately 75° metatarsophalangeal joint extension. The user can also achieve a normal range of extension of about 70° and flexion of about 45°.

The device 100 includes a third portion 112 that is generally shaped as a wing. The third portion 112 has a third surface 114. The third surface 114 is shaped to position one or more toes of a foot in extension with the one or more toes against the third surface 114. The third surface 114 includes a flat section 114*a* and a curved section 114*d* upon which the toes rest when in extension.

The device 100 includes a fourth portion 116 that is generally shaped as a wing. The fourth portion 116 has a fourth surface 118. Similar to the third surface 112, the fourth surface 118 is shaped to position one or more toes of a foot in extension with the one or more toes against the fourth surface 118. The fourth surface 118 also includes a flat section 118*a* and a curved section 118*b*.

In one or more embodiments, the third surface 114 and the fourth surface 118 can include one or more indentations 120. Each of the indentations 120 is configured to compliment one toe of a foot with the foot against the third surface 114 or the fourth surface 118. In one or more embodiments, the third surface 114 and the fourth surface 118 can include one, two, three, four, or five indentations to correspond with one, two, three, four, or five toes of the foot, respectively. Further, the third surface 114 and the fourth surface 118 can each have the same number of indentations or can have a different number of indentations. In one or more preferred embodiments, the third surface 114 and the fourth surface 118 can each include four indentations 120.

The indentations 120 can all have the same shape and configuration. Alternatively, each of the indentations 120 can have a different shape or configuration than the other indentations. As illustrated in FIG. 1B, the four indentations 120 can have different shapes and configurations that are configured for different toes. For example, the indentations 120*a* can be shaped and arranged among the indentations 120 for a big toe. The indentations 120*b* can be shaped and arranged among the indentations 120 for a second toe. The indentations 120*c* can be shaped and arranged among the indentations 120 for a third toe. The indentations 120*d* can be shaped and arrange among the indentations 120 for a fourth toe.

The indentation 120*a* can be sized to accommodate a big toe. In one or more embodiments, the indentation 120*a* can be about 2.5 cm wide and about 6 cm long. The indentations 120*b*-120*d* can be sized to accommodate the second, third, and fourth toes, respectively. In one or more embodiments, the indentations 120*b*-120*d* can be about 2.5 cm, 2.5 cm, and 4 cm wide, respectively, and about 5 cm, 4 cm, and 3 cm long, respectively. The indentations also are oriented with respect to each other and the third surface 114 and the fourth surface 118 to promote spreading of the toes when in extension.

With the indentations 120*a*-120*d* arranged on the third surface 114 and the fourth surface 118 as illustrated in FIG. 1B, the third surface 114 is configured to place the toes of a left foot into extension with the toes against the third surface 114. Similarly, the fourth surface 118 is configured to place the toes of a right foot into extension with the toes against the fourth surface 118.

In one or more embodiments, the third surface 114, the fourth surface 118, or both can include a ledge 122. In particular, the third surface 114 and the fourth surface 118 can include a ledge 122 when the third surface 114 and the fourth surface 118 include four indentations 120. The ledge 122 can be configured to support the little toe of the foot with the toes of the foot in extension. In one or more embodiments, the ledge 122 and be about 5 cm wide and about 2.5 cm long.

In one or more embodiments, the third portion 112 and the fourth portion 116 can be the same size. Alternatively, in one or more embodiments, the third portion 112 can be smaller or larger than the fourth portion 116. More specifically, the first section 114*a* of the third surface 114 can be larger than the first section 118*a* of the fourth surface 118. The first section 114*a* can be larger in the length direction, the width direction, or both. Correspondingly, the first section 118*a* of the fourth surface 118 can be larger than the first section 114*a* of the third surface 114 in the length direction, the width direction, or both when the fourth portion 116 is larger than the third portion 112. In one or more embodiments, the dimensions of the third portion 112 (or the fourth portion 116) may be larger to provide a surface for inversion and eversion of a foot against the device 100. In one or more embodiments, the fourth surface 118 can be about 13 cm long at the transition between the first section 114*a* and second section 114*b*, and the third surface 114 can be about 9.5 cm long between the first section 118*a* and second section 118*b*. Both the third surface 114 and the fourth surface 118 can be about 5 cm wide, from the base 102 to the beginning of the indentations 120. The larger dimensions of the fourth surface 118 provide a larger surface for manipulating the foot by inversion and eversion than the third surface 114. Further, both the right foot and the left foot can be manipulated by inversion and eversion on the fourth surface 118 such that both of the fourth surface 118 and the third surface 114 do not need to be the same size.

The device 100 can be symmetrical along its longest dimension when the third portion 112 and the fourth portion 116 are the same size and shape. Alternatively, the device 100 can be asymmetrical along its longest dimension when the third portion 112 and the fourth portion 116 are different sizes or shapes.

In one or more embodiments, the device 100 includes a transition surface 124 where the first surface 106 meets the second surface 110. The transition surface 124 transitions from the inclined first surface 106 to the generally vertical third section 110*c* of the second surface 110. The transition surface 124 can be rounded to provide a curved surface upon which to manipulate the foot. In one or more embodiments, the rounded transition surface 124 can have a radius of curvature of about 2.5 cm.

In one or more embodiments, the transition surface 124 can include partially spherical sections 126. The partially spherical sections 126 are shaped to provide a surface for more fine massaging or otherwise manipulating of surfaces or sections of the foot. The partially spherical sections 126 can be slightly elevated relative to the rest of the transition surface 124 for extra clearance from the transition surface 124. The extra clearance provides better exposure to the partially spherical section 126 for abutting against various surfaces or sections of the foot.

The device 100 can be constructed of various materials that support the weight of a foot, in addition to the body weight used to massage and stretch the foot. Exemplary materials that can be used to form the device 100 include various metals and metal alloys, such as iron, steel, aluminum, titanium, tungsten carbide, etc., various hard plastics that can support weights up to, for example, 400 pounds, and various fiber reinforced materials, such as carbon fiber, etc. In one or more embodiments, the device 100 can be solid or hollow. The device 100 being hollow can reduce the cost of materials and reduce the weight of the device 100, while still providing a structure that does not substantially deform during use. The device 100 can also be formed according to various methods of manufacture, such as casting, molding, machining, joining, or three-dimensional (3D) printing, to name a few.

Although the device 100 is disclosed as including the first portion 104, the second portion 108, the third portion 112, and the fourth portion 116, in one or more embodiments, one or more of the portions 104, 108, 112, and 116 can be omitted. In one or more embodiments, a device according to the present disclosure can include only the first portion 104 and the second portion 108. In one or more embodiments, a device according to the present disclosure can include only the first portion 104 and the third portion 112, or the fourth portion 116, or both the third portion 112 and the fourth portion 116 both. In one or more embodiments, a device according to the present disclosure can include only the second portion 108 and the third portion 112, or the fourth portion 116, or both the third portion 112 and the fourth portion 116. In one or more embodiments, a device according to the present disclosure can include only the third portion 112 and the fourth portion 116. In embodiments where one or more of the portions 104, 108, 112, and 116 are omitted, any area of the device missing based on the omission of one of the portions 104, 108, 112, or 116, but required for the remaining portions 104, 108, 112, or 116 to connect, can be replaced with any generic shape of the material used in forming the device, or can be omitted entirely if not required. Moreover, although the device 100 with the portions 104, 108, 112, and 116 generally forms a plus symbol, the portions 104, 108, 112, and 116 can be connected together according to different configurations and form different shapes.

Figure 2A:
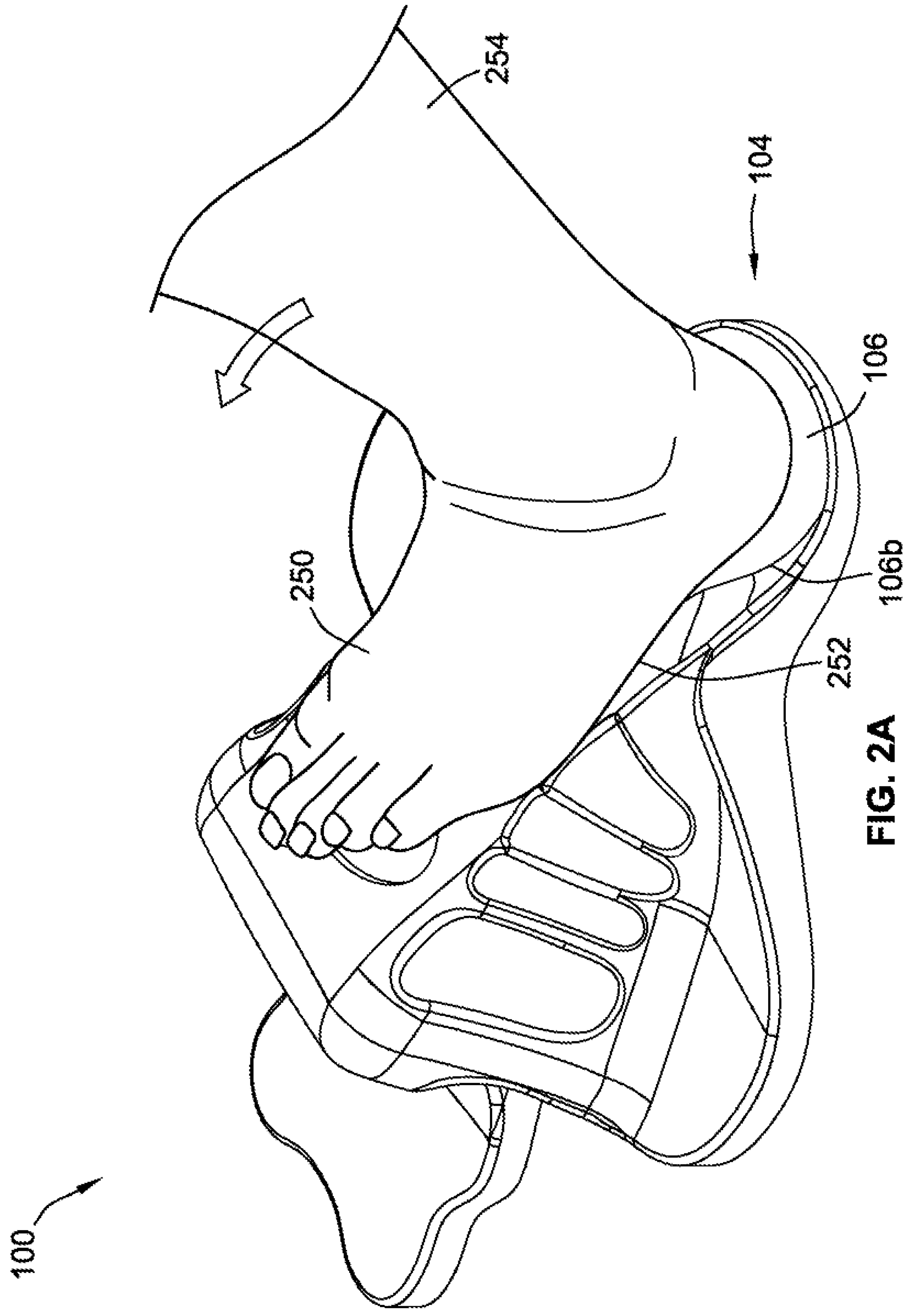
FIG. 2A illustrates a foot on the orthopedic device in a first stage of dorsiflexion, in accord with aspects of the present disclosure.
Figure 2B:
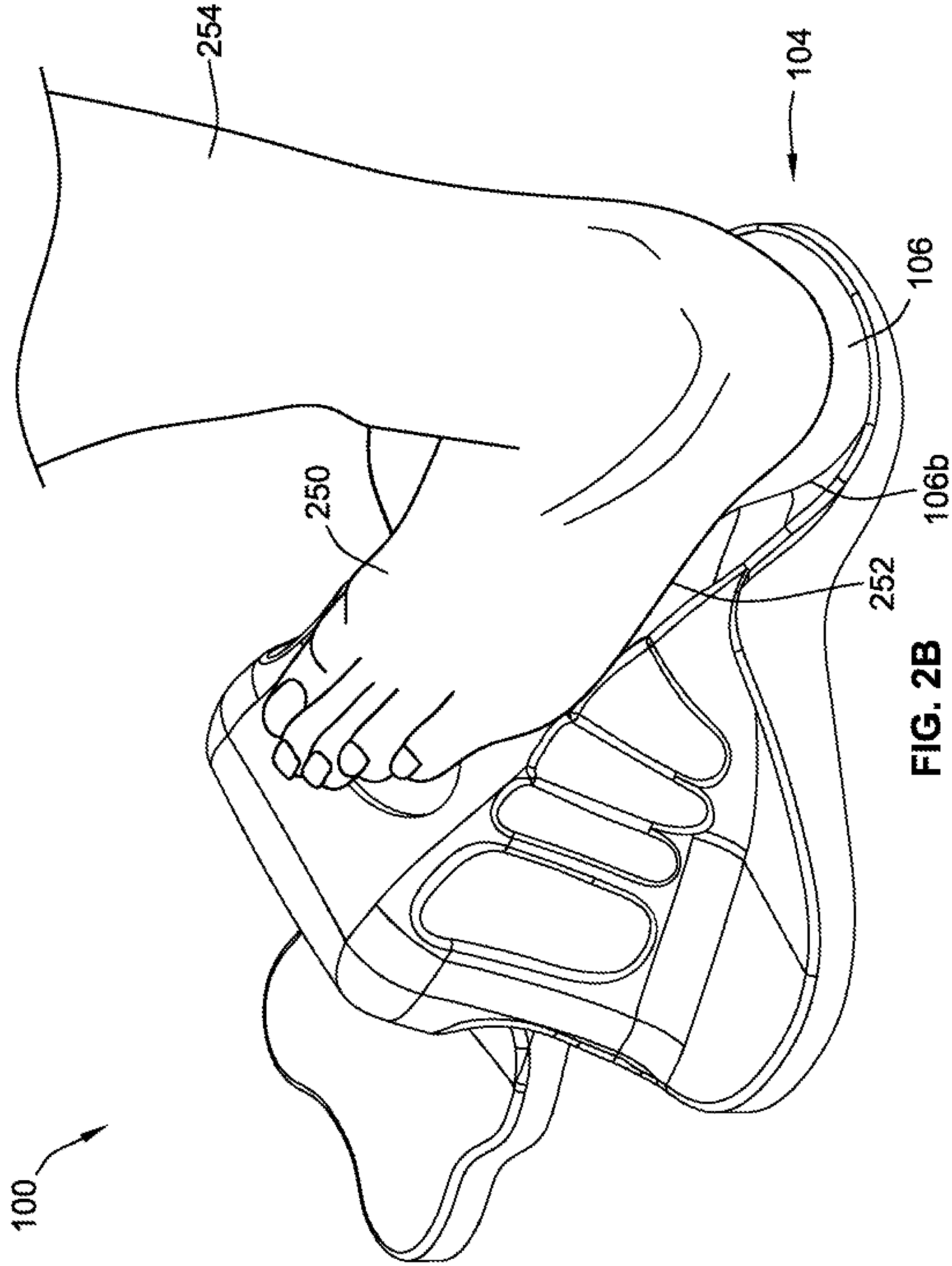
FIG. 2B illustrates a foot on the orthopedic device in a second stage of dorsiflexion, in accord with aspects of the present disclosure.

FIGS. 2A and 2B illustrate a foot 250 on the first portion 104 of the orthopedic device 100 undergoing dorsiflexion, in accord with aspects of the present disclosure. Referring to FIG. 2A, the foot 250 can be positioned on the first portion 104 so that the first surface 106 compliments the sole 252 of the foot, including the heel 252 of the foot 250 being surrounded by the ridges 106*a* (not shown), 106*b*. Initially, the foot 250 is positioned on the first portion 104 with the leg 254 angled relative to the normal. Referring to FIG. 2B, the leg 254 can then be moved forward in the direction of the arrow causing the foot 250 to undergo dorsiflexion. The leg 254 can be repeatedly moved between the orientations in FIGS. 2A and 2B to cause dorsiflexion of the foot 250. The arrangement of the first portion 104 on the device 100 and the contour of the first surface 106 of the first surface 104 promote Achilles stretch, among other movements, with the foot 250 planted against the first surface 104.

Figure 3A:
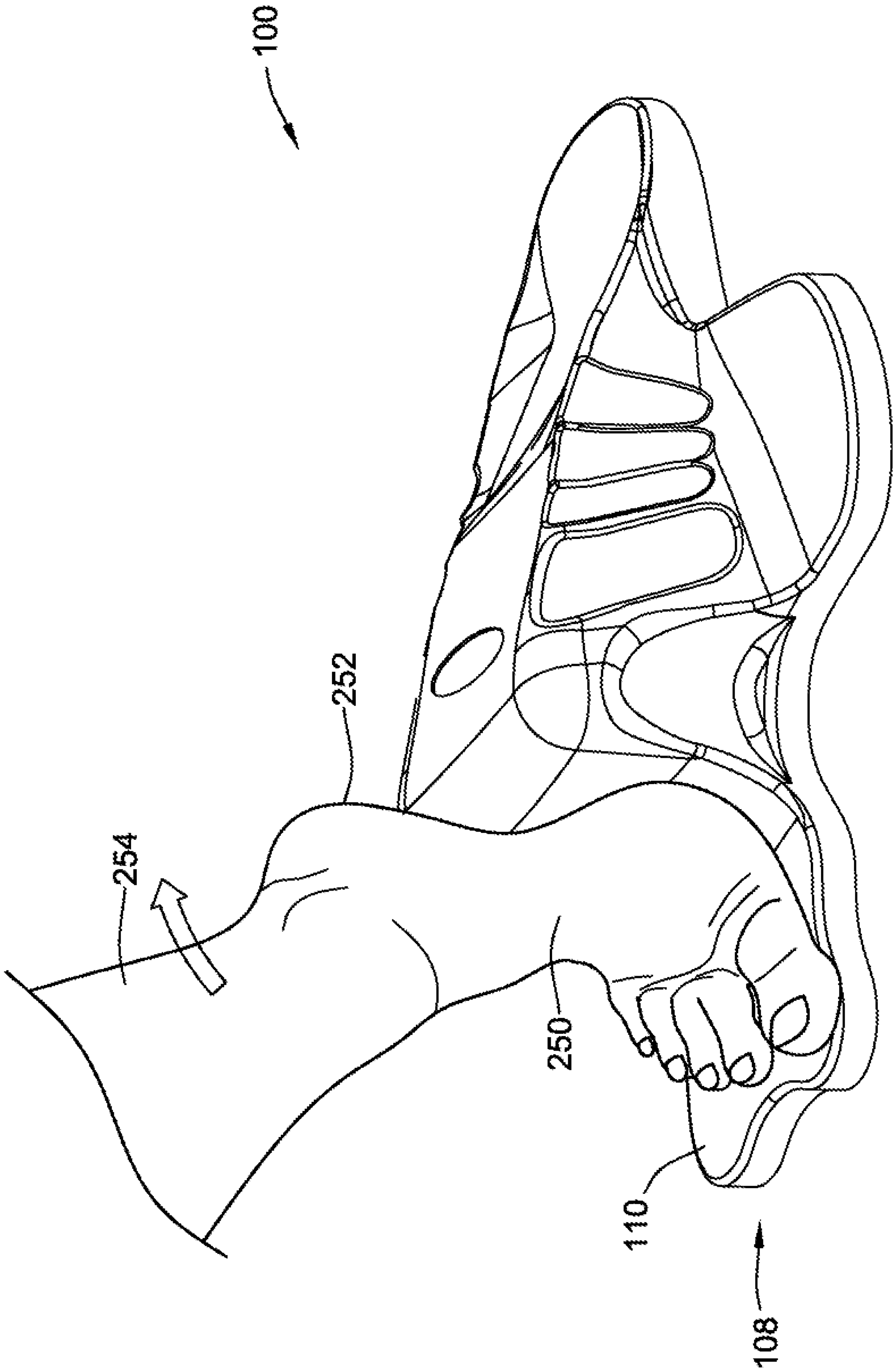
FIG. 3A illustrates a foot on the orthopedic device in a first stage of plantar flexion, in accord with aspects of the present disclosure.
Figure 3B:
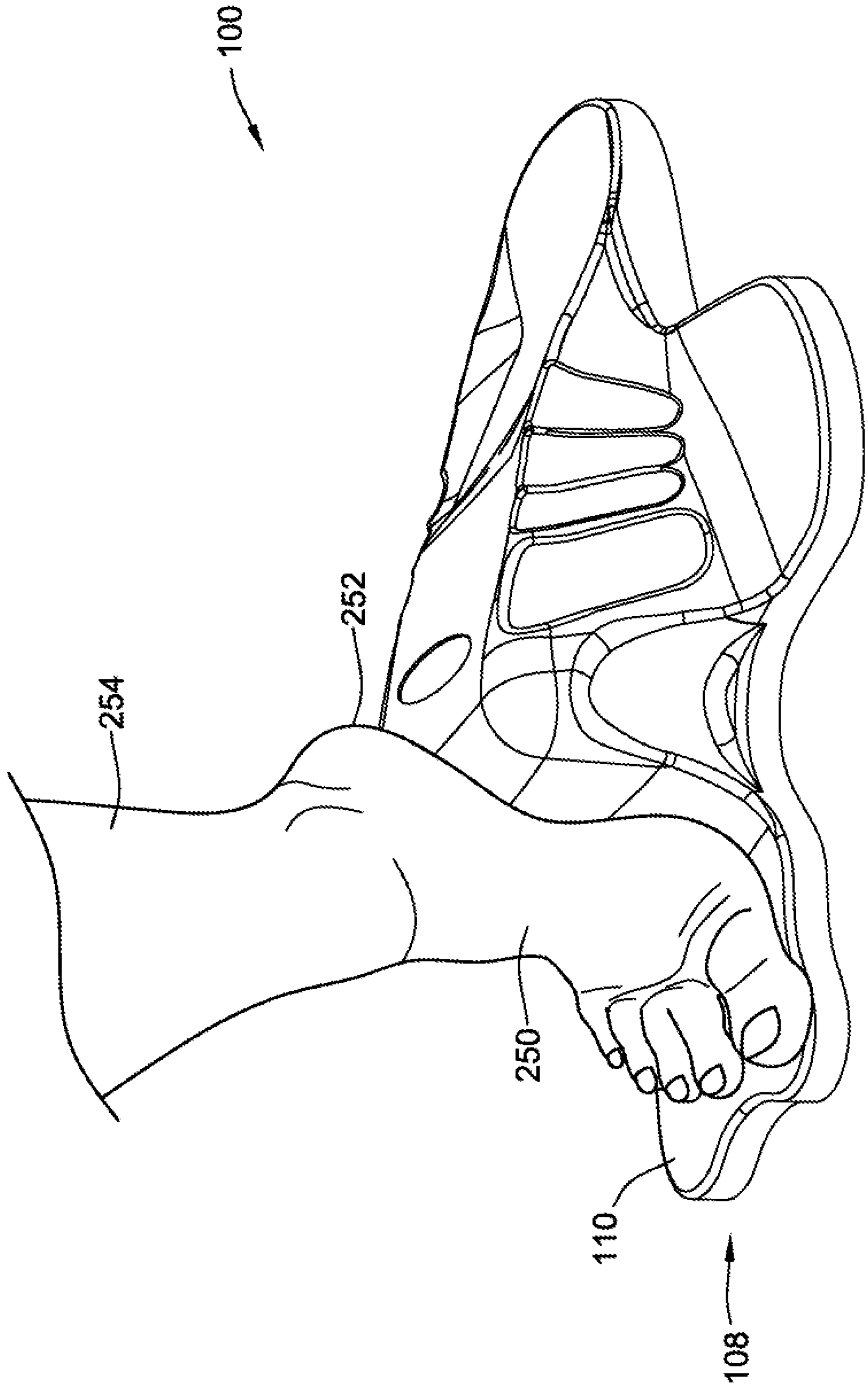
FIG. 3B illustrates a foot on the orthopedic device in a second stage of plantar flexion, in accord with aspects of the present disclosure.

FIGS. 3A and 3B illustrate the foot 250 on the second portion 108 of the orthopedic device 100 undergoing plantar flexion, in accord with aspects of the present disclosure. Referring to FIG. 3A, the foot 250 can be positioned on the second portion 108 so that the second surface 110 compliments the sole 252 of the foot 250. Initially, the foot 250 is positioned on the second portion 108 with the leg 254 forward of the device 100. Referring to FIG. 3B, the leg 254 can then be moved backward in the direction of the arrow causing the foot 250 to undergo plantar flexion. The arrangement of the second portion 108 on the device 100 and the contour of the second surface 110 of the second portion 108 promote plantar stretch, among other movements, with the foot 250 planted against the second surface 110.

Figure 4:
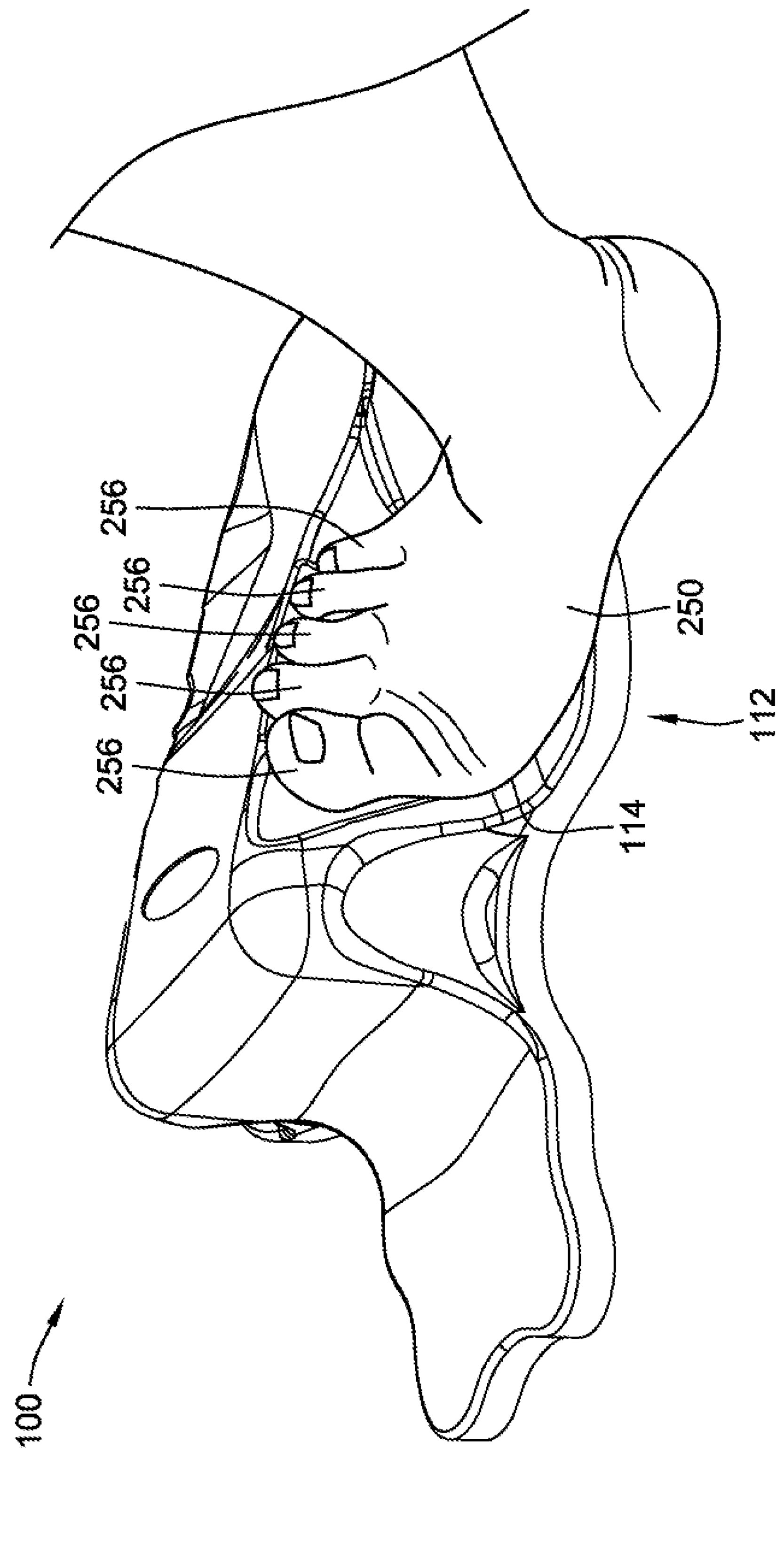
FIG. 4 illustrates a foot on the orthopedic device undergoing toe extension, in accord with aspects of the present disclosure.

FIG. 4 illustrates the foot 250 on the third portion 112 of the orthopedic device 100 undergoing toe extension, in accord with aspects of the present disclosure. A user of the device 100 can press the toes 256 of the foot 250 against the third surface 114 to extend the toes 256. FIG. 4 illustrates the right foot and the third surface 114 configured to compliment the right foot. Although not shown, the toes of a left foot can similarly be pressed up against the fourth surface 118 to extend the toes.

Figure 5:
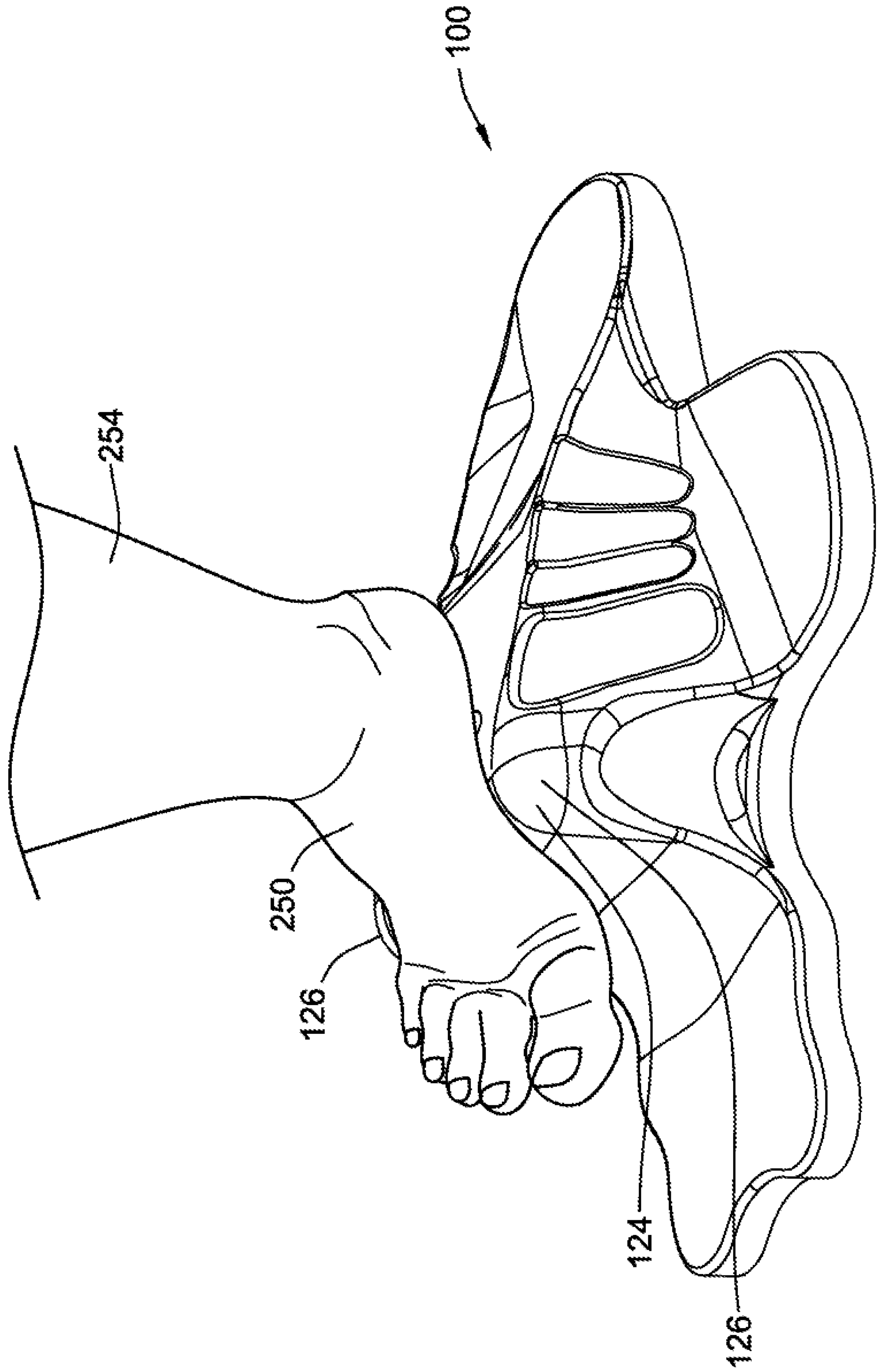
FIG. 5 illustrates a foot on the orthopedic device undergoing deep tissue massage, in accord with aspects of the present disclosure.

FIG. 5 illustrates the foot 250 on the transition surface 124 undergoing deep tissue massage, in accord with aspects of the present disclosure. The partially spherical portions 126 present surfaces that allow for the foot 250 to be pressed against to massage, for example, the arch, the heel, the ball, the forefoot, etc. of the foot. The transition surface 124 also forms a roll bar for the foot 250 to provide a wider surface upon which to roll or otherwise manipulate the foot 250 against.

Figure 6:
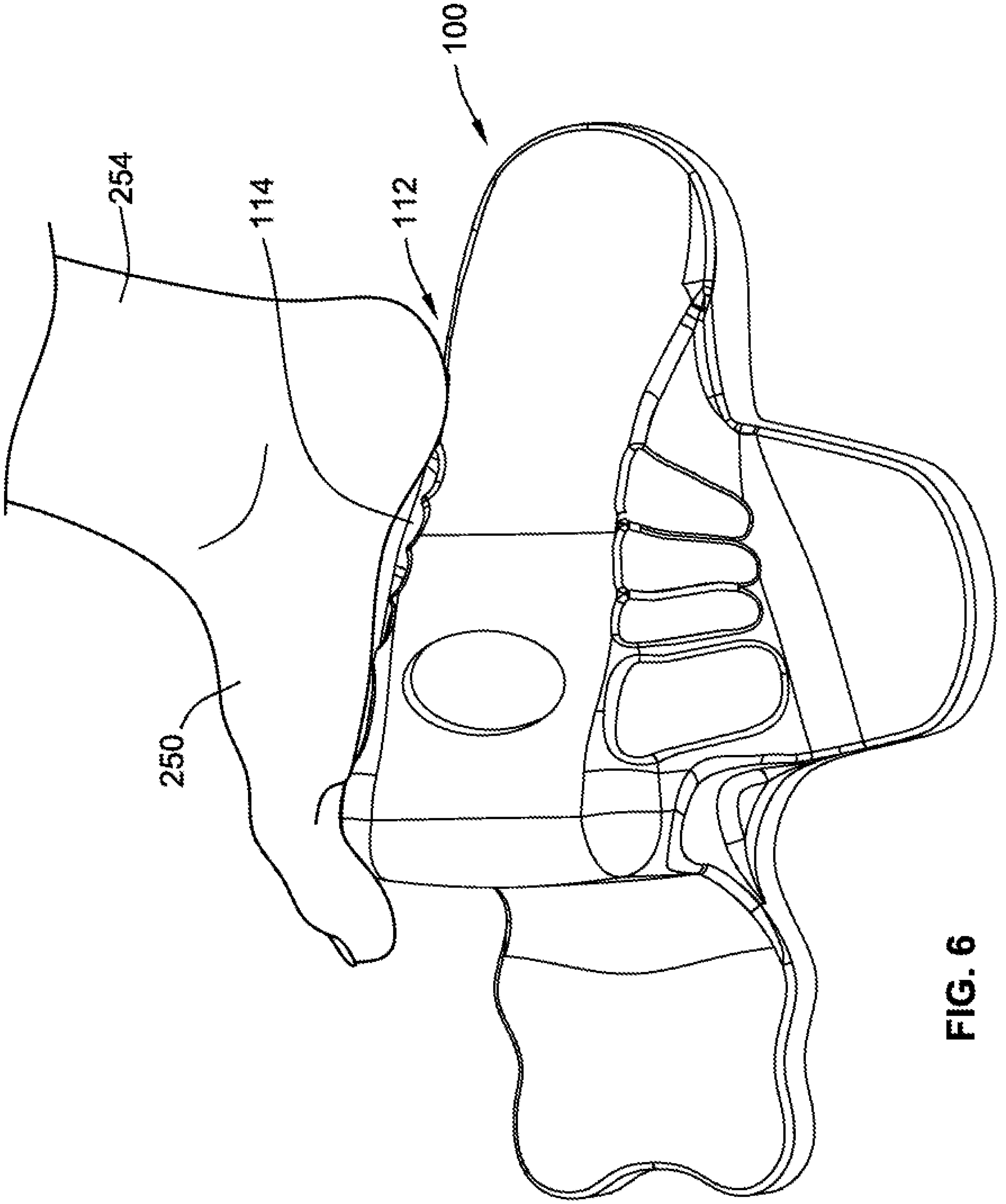
FIG. 6 illustrates a foot on the orthopedic device undergoing inversion, in accord with aspects of the present disclosure.
Figure 7:
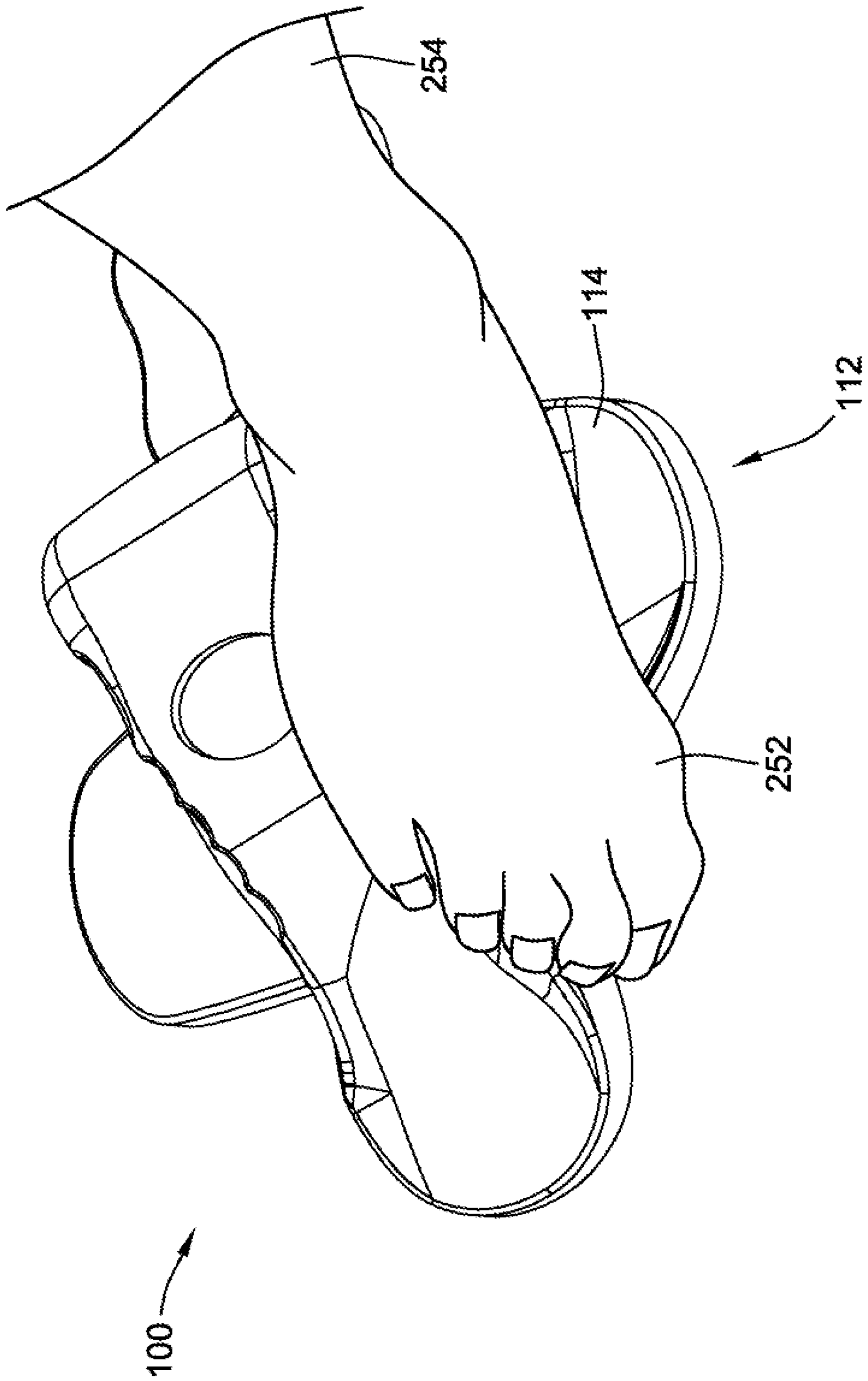
FIG. 7 illustrates a foot on the orthopedic device undergoing eversion, in accord with aspects of the present disclosure.
Figure 8A:
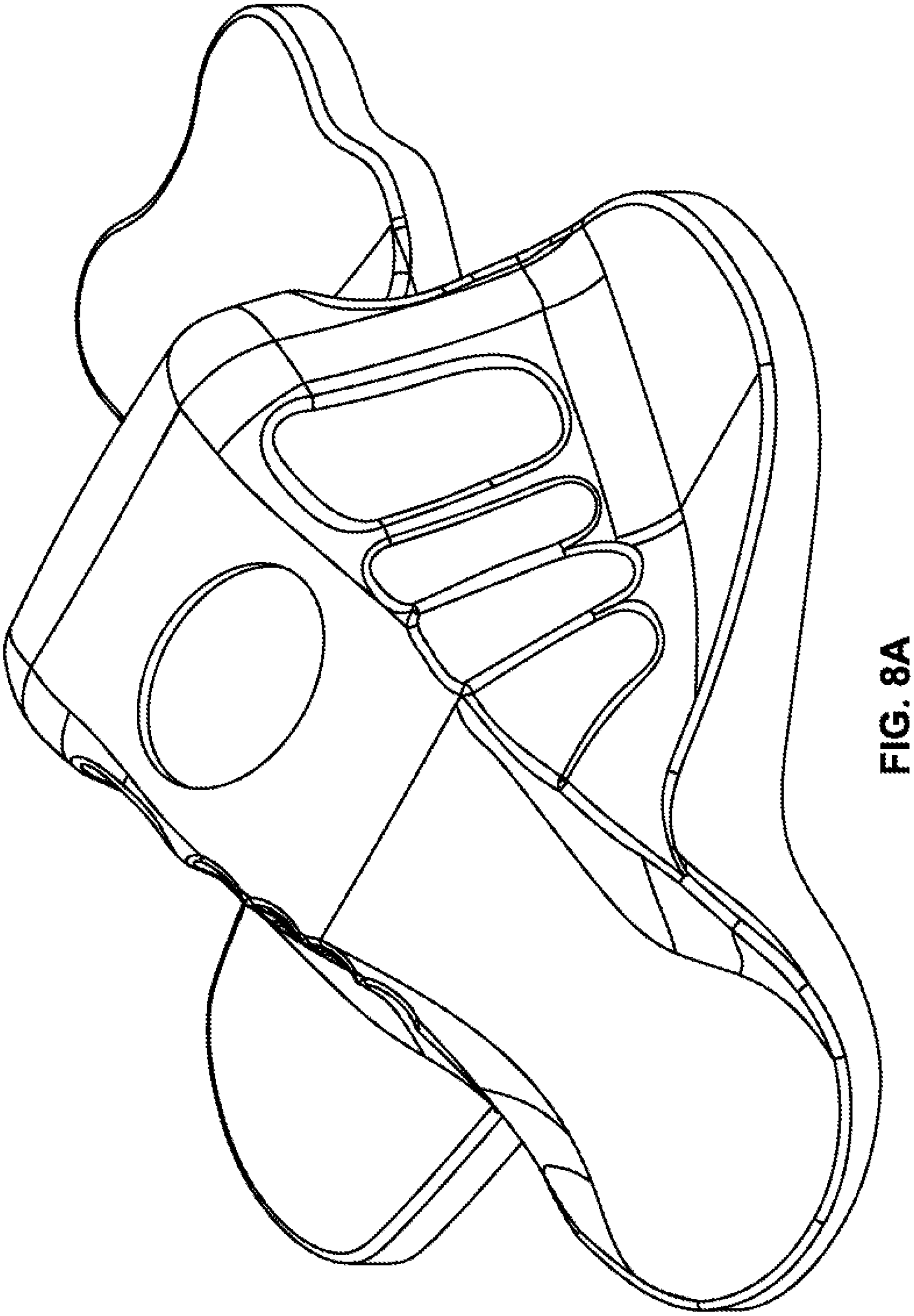
FIG. 8A is an isometric view of the orthopedic device, in accord with aspects of the present disclosure.
Figure 8B:
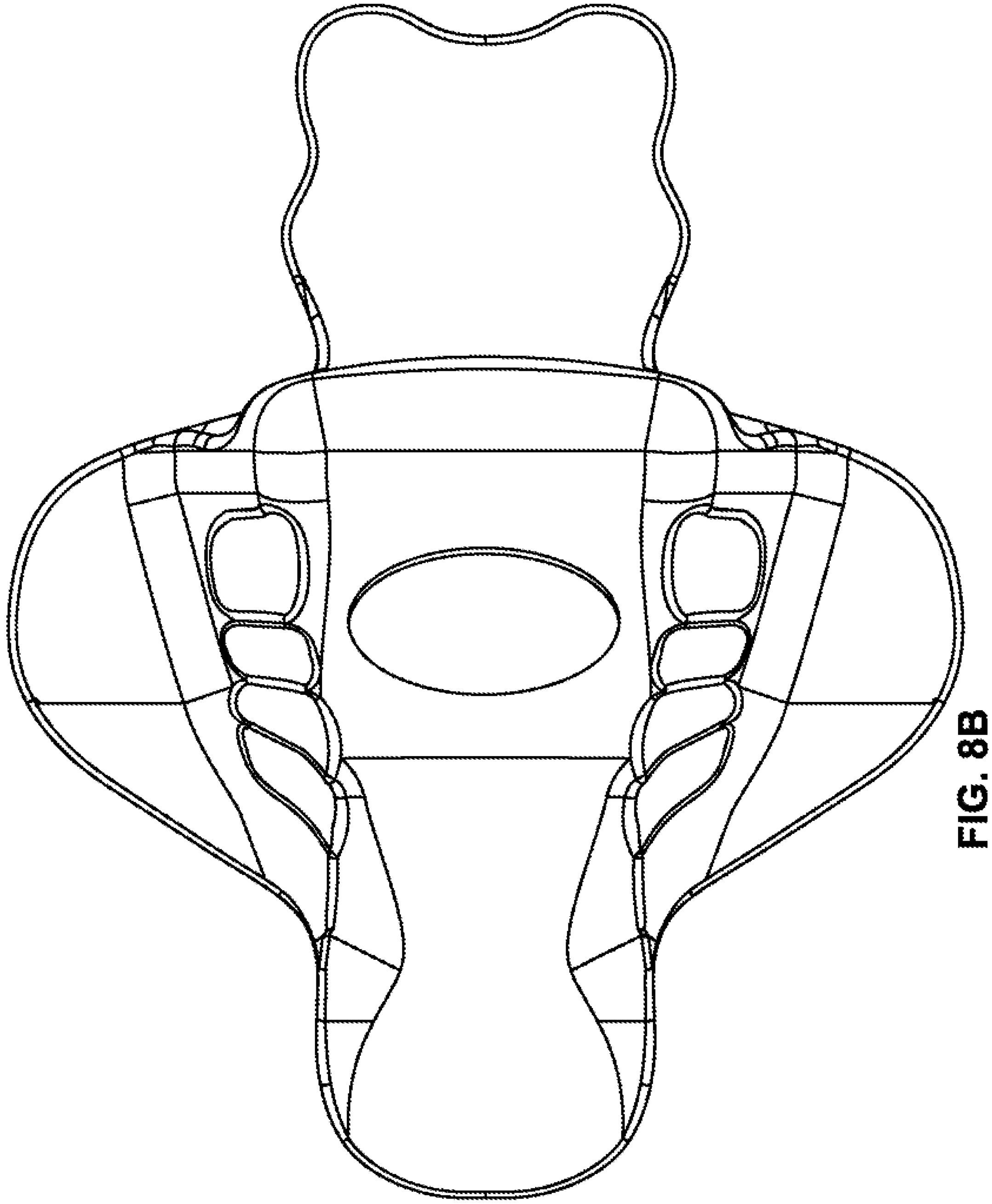
FIG. 8B is a top view of the orthopedic device, in accord with aspects of the present disclosure.
Figure 8C:
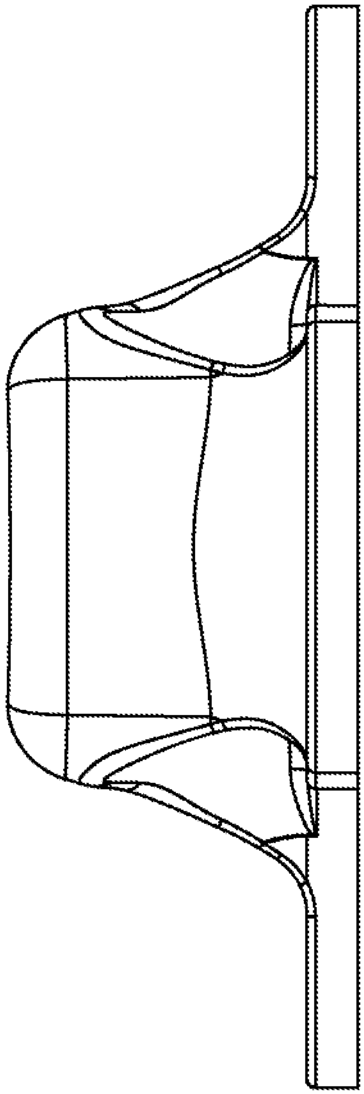
FIG. 8C is a front view of the orthopedic device, in accord with aspects of the present disclosure.
Figure 8D:
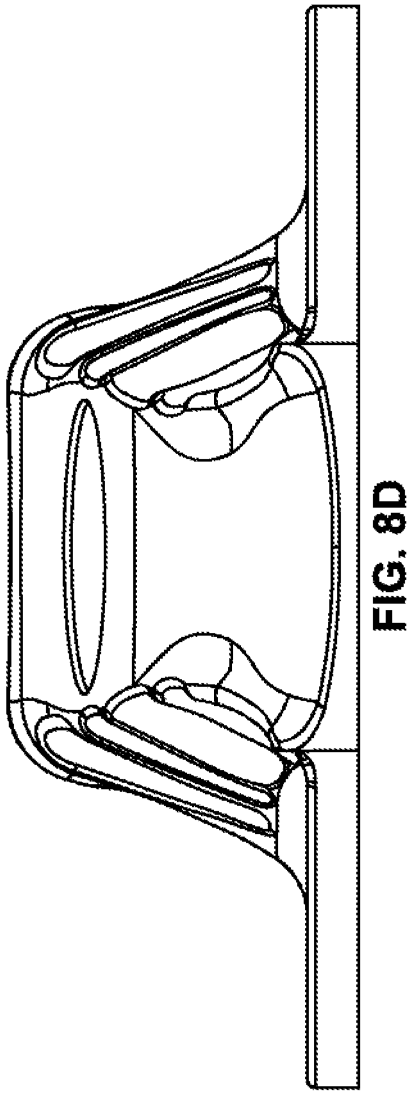
FIG. 8D is a back view of the orthopedic device, in accord with aspects of the present disclosure.
Figure 8E:
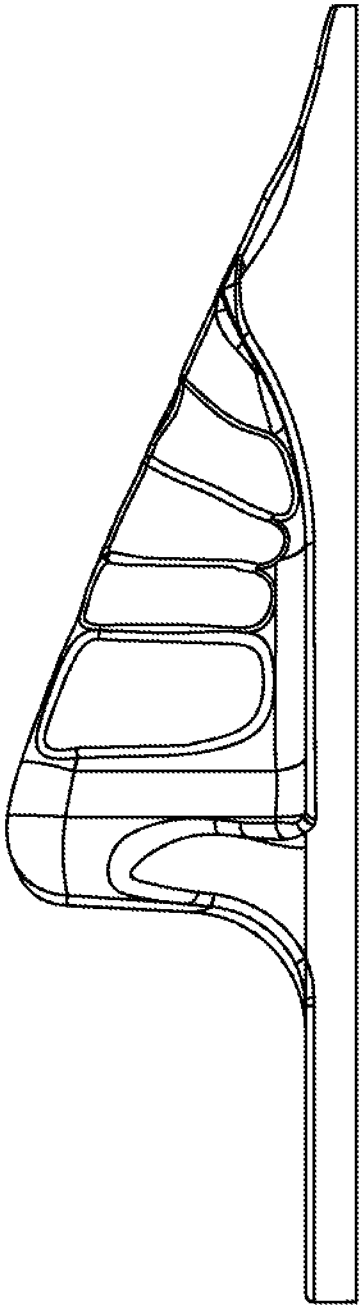
FIG. 8E is a right-side view of the orthopedic device, in accord with aspects of the present disclosure.
Figure 8F:
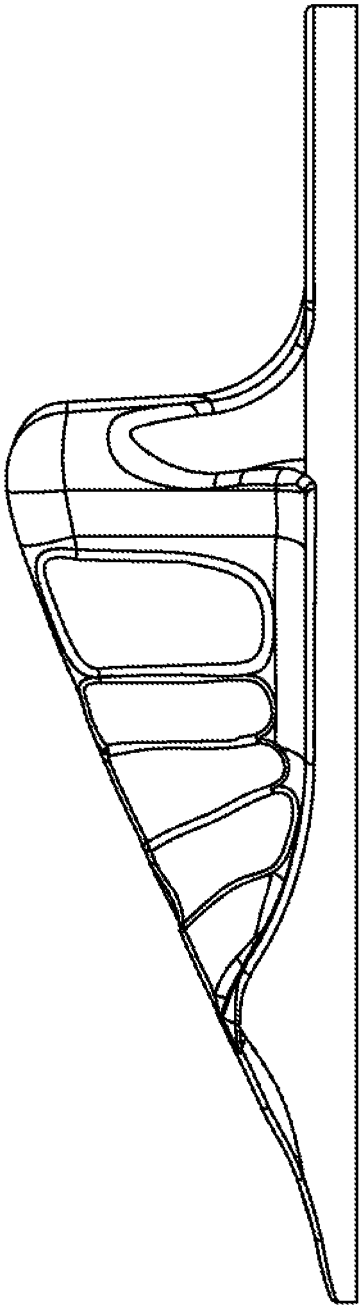
FIG. 8F is a left-side view of the orthopedic device, in accord with aspects of the present disclosure.
Figure 8G:
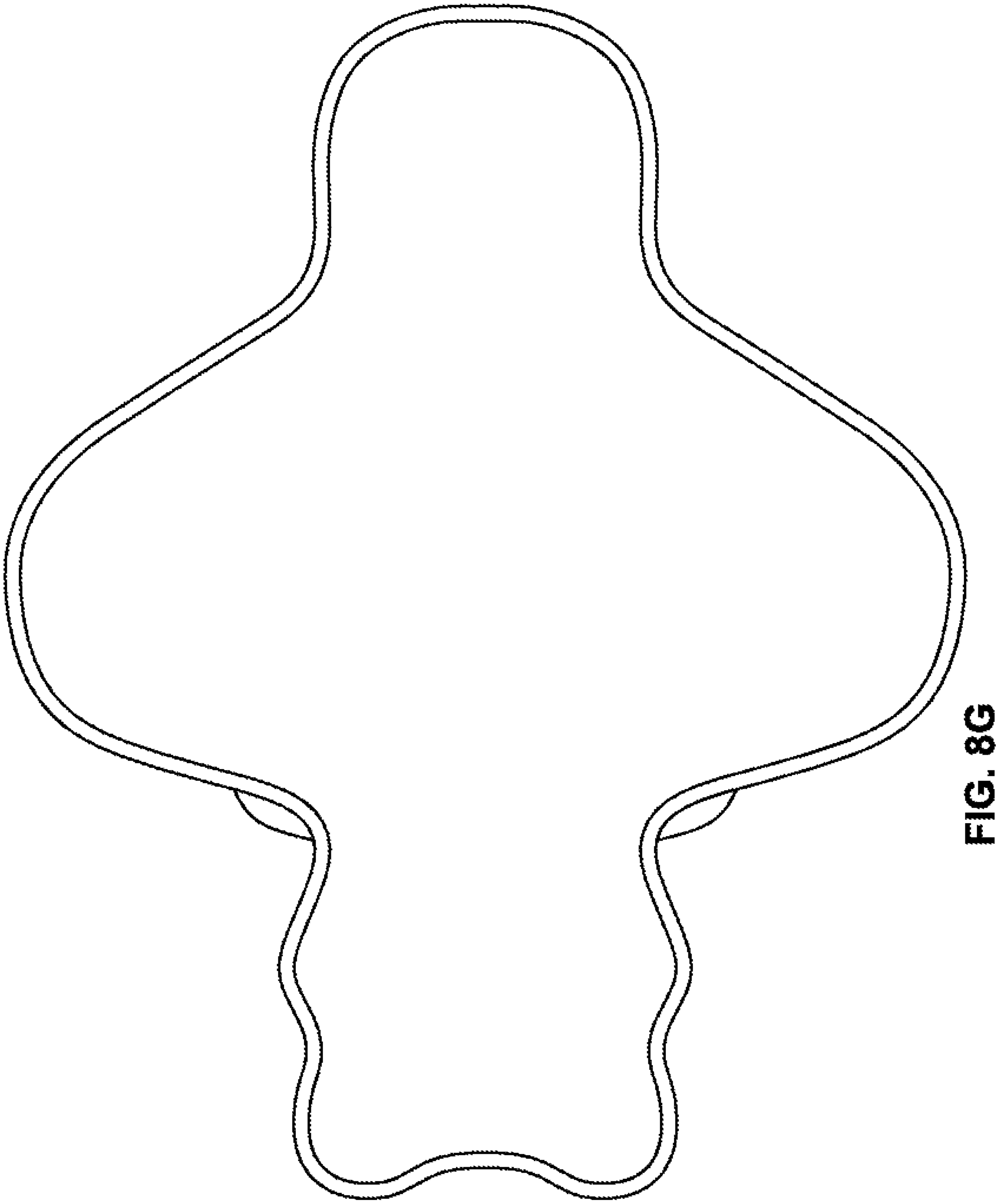
FIG. 8G is a bottom view of the orthopedic device, in accord with aspects of the present disclosure.

FIG. 6 illustrates the foot 250 on the third portion 114 of the orthopedic device 100 undergoing inversion, in accord with aspects of the present disclosure. Inversion is the movement of the sole 252 of the foot 250 towards the median plane, similar to supination. Inversion help stretch the lateral to mid-line components of the foot and ankle (post lateral sprain) and, more specifically, can stretch the lateral collateral ligament of the ankle joint, anterior talofibular ligament, posterior talofibular ligament, and calcaneofibular ligament, FIG. 7 illustrates the foot 250 on the third portion 114 of the orthopedic device 100 undergoing eversion, in accord with aspects of the present disclosure. Eversion is the movement of the sole 252 of the foot 250 away from the median plane, similar to pronation. Eversion movement of the foot 250 promotes stretching of the deltoid ligaments, from the distal tibia to the navicular bone attachments.

FIGS. 8A-8G illustrate various aspects of the present disclosure, and their descriptions can be found in the above Brief Description of the Drawings. Broken lines, if any, shown in FIGS. 8A-8G are only for illustrative purposes to show visible environmental structure and form no part of the claimed invention. Further, any and all solid lines in FIGS. 8A-8G can be converted to a broken line, and any and all broken lines can be converted to a solid line, without departing from the spirit and scope of the present disclosure.

The device according to the present invention promotes recovery of the foot, ankle, and lower leg after injury or surgery by promoting stretching of the foot, ankle, and lower leg using body weight. In addition, the one or more embodiments of the device of the present invention promote maintenance of a full range of motion in the foot and reduce the likelihood of injury. The one or more embodiments of the device promote the manipulation and adjustment of the soft tissue and bone alignment in the feet, ankles, and lower legs for recovery from Achilles tendonitis, plantar fasciitis, toe mobility restrictions, to name a few examples.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A device for manipulating at least one foot comprising: a substantially flat base configured to provide support for the device against a surface; a first portion having a first surface that is inclined relative to the substantially flat base, the first portion shaped and configured to cup a heel of the at least one foot, with the heel against the first surface, the first surface shaped to centrally locate the foot of the at least one foot on the device in a first position, wherein the first surface comprises ridges configured to cup the heel on one side of the heel;

a second portion having a concave second surface shaped and configured to orientate the at least one foot with respect to the device in a second position placing a forefoot of the at least one foot in plantar flexion when the forefoot is placed against the concave second surface, wherein the concave second surface has a horizontal flat section and a generally vertical flat section separated by a curved section, the second portion comprises a convex surface positioned directly between the first inclined surface and the generally vertical flat section, the convex surface extend from a front of the first portion, wherein the horizontal flat section comprises a distal protrusion configured to support a big toe of the at least one foot with the at least one foot in the plantar flexion by the forefoot being placed against the generally vertical flat section and the curved section, wherein the horizontal flat section is configured to support the forefoot of the at least one foot when positioning the forefoot in the plantar flexion in the second position;

a third portion having a flat third surface and an inclined third surface shaped to orientate the at least one foot with respect to the device in a third position placing one or more toes of the at least one foot in extension with the one or more toes placed against the inclined third surface;

wherein the inclined third surface comprises a first plurality of indentations, and each indentation of the first plurality of indentations is configured to complement one toe of the one or more toes with the one or more toes placed against the inclined third surface; and wherein the third portion is generally wing-shaped extending away from the first portion and the second portion, and wherein the third portion extends from a lateral side of the first portion.

2. The device of claim 1, wherein the first plurality of indentations is arranged on the inclined third surface for the one or more toes of a left foot.

3. The device of claim 1, wherein the first plurality of indentions is arranged on the inclined third surface for the one or more toes of a right foot.

4. The device of claim 1, wherein the first plurality of indentations includes four indentations configured to complement four toes of the at least one foot.

5. The device of claim 4, wherein the four toes are the big toe, a second toe, a third toe, and a fourth toe.

6. The device of claim 1, wherein the first plurality of indentations includes five indentations configured to complement five toes of the at least one foot.

7. The device of claim 1, further comprising:

a fourth portion having an inclined fourth surface shaped to orientate the at least one foot with respect to the device in a fourth position placing one or more toes of the at least one foot in extension with the one or more toes placed against the inclined fourth surface.

8. The device of claim 7, wherein the inclined third surface comprises the first plurality of indentations, and each indentation of the first plurality of indentations is configured to complement one toe of a first foot of the at least one foot, and wherein the inclined fourth surface comprises a second plurality of indentations, and each indentation of the second plurality of indentations is configured to complement one toe of a second foot of the at least one foot.

9. The device of claim 8, wherein the first foot is a right footand the second foot is a left foot.

10. The device of claim 7, wherein the device is asymmetrical along a longest dimension of the device.

11. The device of claim 1, wherein the first surface is angled relative to the substantially flat base about 15 to 25 degrees.

12. The device of claim 1, wherein the concave second surface forms approximately a right angle.

13. The device of claim 1, wherein a distal portion of the concave second surface is approximately parallel to the substantially flat base.

14. The device of claim 1, further comprising:

a transition surface between the first surface and the concave second surface, the transition surface comprising at least one partially spherical section.

15. The device of claim 14, wherein the transition surface comprises two rounded portions.

16. The device of claim 1, wherein the first surface is asymmetrical along a longest dimension of the device.

17. The device of claim 1, wherein the concave second surface is symmetrical along a longest dimension of the device.

18. The device of claim 1, wherein the first surface comprises additional ridges configured to cup the heel on an opposite side.

19. The device of claim 1, wherein the first surface is contoured to compliment a curvature of an arch of the at least one foot.

20. A device for manipulating feet comprising:

a substantially flat base configured to provide support for the device;

a first portion having a first surface that is inclined relative to the substantially flat base, the first portion shaped and configured to cup a heel of a foot, with the heel against the first surface, the first surface shaped to centrally locate the foot on the device in a first position, wherein the first surface comprises ridges configured to cup the heel on one side of the heel;

a second portion having a horizontal flat section and a generally vertical flat section, the second portion shaped to orientate the at least one foot with respect to the device in a second position placing a forefoot of the at least one foot in plantar flexion when the forefoot is placed against the horizontal flat section; the second portion comprises a convex surface positioned directly between the first surface and the generally vertical flat section, the convex surface extend from a front of the first portion, wherein the horizontal flat section comprises a distal protrusion configured to support a big toe of the foot with the foot in plantar flexion by the forefoot being placed against the second portion;

a first toe extension portion having a flat surface and an inclined first toe extension surface shaped to orientate the at least one foot with respect to the device in a third position placing one or more toes of one foot of a right foot or a left foot in extension with the one or more toes of the one foot placed against the inclined first toe extension surface;

wherein the inclined first toe extension surface comprises a first plurality of indentations, and each indentation of the first plurality of indentations is configured to complement one toe of the one or more toes with the one or more toes placed against the inclined first toe extension surface; and a third portion is generally wing-shaped extending away from the first portion and the second portion, and wherein the third portion extends from a lateral side of the first portion.

21. The device of claim 20, further comprising:

a second toe extension portion having an inclined second toe extension surface shaped to orientate the foot with respect to the device in a fourth position placing one or more toes of an opposite foot of the foot in extension with the one or more toes of the opposite foot of the foot placed against the inclined second toe extension surface.

* * * * *